US009116255B2

(12) United States Patent
Eick et al.

(10) Patent No.: US 9,116,255 B2
(45) Date of Patent: Aug. 25, 2015

(54) TWO-WAY WAVE EQUATION TARGETED DATA SELECTION FOR IMPROVED IMAGING OF PROSPECTS AMONG COMPLEX GEOLOGIC STRUCTURES

(75) Inventors: Peter M. Eick, Houston, TX (US); Joel D. Brewer, Houston, TX (US); Charles C. Mosher, Houston, TX (US); Jun Cao, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 664 days.

(21) Appl. No.: 13/482,636

(22) Filed: May 29, 2012

(65) Prior Publication Data

US 2012/0300584 A1    Nov. 29, 2012

Related U.S. Application Data

(60) Provisional application No. 61/491,034, filed on May 27, 2011, provisional application No. 61/540,368, filed on Sep. 28, 2011, provisional application No. 61/491,050, filed on May 27, 2011, provisional application No. 61/540,348, filed on Sep. 28, 2011.

(51) Int. Cl.
*G01V 1/00* (2006.01)
*G01V 1/34* (2006.01)
(Continued)

(52) U.S. Cl.
CPC .  *G01V 1/345* (2013.01); *G01V 1/20* (2013.01); *G01V 1/282* (2013.01); *G01V 2210/614* (2013.01); *G01V 2210/671* (2013.01)

(58) Field of Classification Search
CPC .... G01V 1/282; G01V 1/305; G01V 2210/51

USPC .......................................................... 367/73
See application file for complete search history.

(56) References Cited

U.S. PATENT DOCUMENTS 6,343,256 B1   1/2002   Winbow et al.
6,418,379 B1   7/2002   Bloor et al.
6,446,009 B1   9/2002   Baeten et al.
(Continued)

FOREIGN PATENT DOCUMENTS

CN    101625417    1/2010
WO     0223222    3/2002
(Continued)

OTHER PUBLICATIONS

Xu, S. and Jin, S., 2005, Can we image beneath salt body?—target-oriented visibility analysis: 75th Annual International Meeting. SEG, Expanded Abstracts.
(Continued)

*Primary Examiner* — Mark Hellner
(74) *Attorney, Agent, or Firm* — ConocoPhillips Company

(57) ABSTRACT

The invention relates to seismic imaging where complex geologies are likely to create data that is confusing or ambiguous for a conventional matrix of source points and receiver locations. With some understanding of the geological substructure, the source points and receiver locations that optimize the imaging may be found by using two-way wave equation propagation coupled with a quality geologic model. With this, the source points and receiver locations that optimize the imaging may be selected and used to better resolve the substructure and avoid the inclusion of data that obscures understanding of the substructure.

21 Claims, 4 Drawing Sheets

(51) Int. Cl.
  *G01V 1/28* (2006.01)
  *G01V 1/20* (2006.01)

(56) References Cited

U.S. PATENT DOCUMENTS

| | | | |
|---|---|---|---|
| 6,643,590 B2 * | 11/2003 | Wiggins | 702/16 |
| 6,665,618 B1 | 12/2003 | Thomas et al. | |
| 6,763,305 B2 | 7/2004 | Bernitsas | |
| 6,847,921 B2 | 1/2005 | Woronow et al. | |
| 6,925,386 B2 | 8/2005 | Pramik et al. | |
| 6,999,879 B2 | 2/2006 | Houck | |
| 7,406,383 B2 | 7/2008 | Herrmann et al. | |
| 7,689,396 B2 | 3/2010 | Campbell | |
| 7,751,279 B2 * | 7/2010 | Zhao et al. | 367/57 |
| 2003/0130796 A1 | 7/2003 | Wiggins | |
| 2007/0259432 A1 | 11/2007 | Zhao et al. | |
| 2008/0106971 A1 | 5/2008 | Wang et al. | |
| 2009/0037114 A1 | 2/2009 | Peng et al. | |
| 2009/0154291 A1 | 6/2009 | Ferber | |
| 2009/0248312 A1 | 10/2009 | Hsu et al. | |
| 2009/0279388 A1 | 11/2009 | Monk et al. | |
| 2010/0204972 A1 | 8/2010 | Hsu et al. | |
| 2011/0013482 A1 | 1/2011 | Eick et al. | |
| 2011/0110190 A1 | 5/2011 | Thomson et al. | |
| 2011/0118985 A1 | 5/2011 | Arre | |

FOREIGN PATENT DOCUMENTS

| | | |
|---|---|---|
| WO | 2010077567 | 7/2010 |
| WO | 2010120301 | 10/2010 |

OTHER PUBLICATIONS

PCT/US12/39863 PCT International Search Report (PCT/ISA/210) Dated Sep. 6, 2012.

* cited by examiner

TWO-WAY WAVE EQUATION TARGETED DATA SELECTION FOR IMPROVED IMAGING OF PROSPECTS AMONG COMPLEX GEOLOGIC STRUCTURES

CROSS-REFERENCE TO RELATED APPLICATIONS

This application is a non-provisional application which claims benefit under 35 USC §119(e) to U.S. Provisional Application Ser. No. 61/491,034, filed May 27, 2011 entitled "Two Way Wave Equation Targeted Data Selection for Improved Imaging of Prospects Among Complex Geologic Structures," which is incorporated herein in its entirety.

This invention is related to U.S. Provisional Application Ser. No. 61/540,368, filed Sep. 28, 2011, entitled "Reciprocal Method Two-Way Wave Equation Targeted Data Selection for Improved Imaging of Prospects Among Complex Geologic Structures," U.S. Provisional Patent Application Ser. No. 61/491,050, filed May 27, 2011 entitled "Two-Way Wave Equation Targeted Data Selection for Seismic Acquisition of Complex Geologic Structures" and U.S. Provisional Patent Application Ser. No. 61/540,348, filed Sep. 28, 2011, entitled "Reciprocal Method Two-Way Wave Equation Targeted Data Selection for Seismic Acquisition of Complex Geologic Structures," which are incorporated herein in their entirety.

STATEMENT REGARDING FEDERALLY SPONSORED RESEARCH

None.

FIELD OF THE INVENTION

This invention relates to seismic imaging of subsurface geologic structures and especially to the imaging of prospects for exploration for hydrocarbon deposits in underground formations.

BACKGROUND OF THE INVENTION

In the process of exploring for hydrocarbons, there are many types of formations that are known for trapping hydrocarbons. It is not uncommon that formations for trapping hydrocarbons are beneath complex geologic structures. Complex geologic structures may only be complex in that it is difficult to resolve the complex structure using seismic imaging or difficult to resolve what is beneath the complex structure using seismic surveying, or both. A simple structure that is complex from a seismic imaging standpoint is one that has gas in it. Gas attenuates compressive waves and, to the extent any compression waves are reflected back to the surface, they are noisy and essentially undecipherable. Big gas deposits may actually create seismic "black holes" hiding or obscuring large areas that could hold significant hydrocarbon deposits.

Salt domes, especially where there are large overhangs, are an example of other relatively simple structures that create complex seismic images. The overhangs caused by iso-static forces at the sides of salt domes tend to be very interesting to hydrocarbon producers because the up-thrust of a salt dome tends to seal the adjacent formations that are lifted above their surrounding plane. Substantial amounts of hydrocarbons may end up trapped at the interface of a salt dome and a hydrocarbon bearing formation, especially where the interface is under the overhang of a mushroom-shaped salt dome. The overhang may take the shape of a mushroom or an anvil or a curling wave in the ocean. Since compression waves travel relatively slow through rock, but comparatively fast through salt, seismic energy that has passed through a salt formation, especially a salt formation with an irregular or complicated shape appears scattered in ways that are not easily resolvable into a coherent image.

Ray tracing techniques have been tried, unfortunately simple ray tracing techniques cannot adequately image the data without severe errors in propagation. Techniques based on one-way wave equation (usually called wave equation in convention) (e.g., Xu, S. and Jin, S., 2005) have inherent problem/limitation in amplitude/energy accuracy and in wide-angle travel time accuracy of the wave propagation especially in models with sharp velocity contrast, e.g. the sediment-salt interface.

Conventional techniques of survey modeling and survey design are not particularly well suited for complex geological situations or for the problems mentioned above. Conventional techniques are primarily ray trace modeling that envisions the seismic energy assuming a straight line path through the earth and reflecting to the seismic receivers. The problem is that the ray trace methods assume that the rays are traveling through homogenous media and reflect or refract at the bed interfaces. Ray trace modeling follows direct lines and does not handle compaction curves cleanly. Ray tracing also does not handle anisotropy well and does not allow accurate representation of dispersion. The advantage of ray trace methods is that they are relatively simple and may provide a coherent image of complex geologic structures. However, full wave equation modeling is far more accurate in its portrayal of seismic energy, and could provide far more accurate images, but computer resources and coding has heretofore been unavailable for reasonably sized acquisition or imaging modeling projects.

BRIEF SUMMARY OF THE DISCLOSURE

The invention more particularly relates to a process for imaging seismic data for a prospect that exists within or near structures that obscure or complicate seismic imaging. The process includes the steps of: a) constructing a first geologic model including information about the size, shape and depth of the obscuring or complicating structure along with a prospect location for further understanding; b) identifying a set of seismic source locations within the seismic data along with seismic acquisition geometry for associated seismic receivers to be evaluated with the geologic model; c) selecting a target on a geologic body for evaluation wherein the target may comprise a portion or an entirety of the prospect location; and d) selecting parameters appropriate for a two-way wave equation propagation. The process further includes the steps of: e) computing a two-way wave modeling for the wavefield propagation from a selected source to the target; f) computing the energy arriving at the target and the associated attributes of the arriving energy at the target; g) computing a two-way wave equation propagation for energy propagation from the target to the receivers associated with the selected source by the acquisition geometry; h) computing the energy and the associated attributes received by the receivers associated with the selected source by the acquisition geometry; i) repeating steps e) through h) for other sources in the selected acquisition geometry; j) from the energy and attributes recorded in step f) create attribute displays that provide visual perspective of one or more attributes of the energy propagated to the target from one or more sources; k) from the energy and attributes computed in step h) create attribute displays that provide visual perspective of one or more attributes of the energy associated with one or more sources propagated from the target to the receivers; l) analyze the attribute displays in step j) and step k) to determine the source/receiver pair information that will provide better imaging of the target; and m) creating one or more geological images of the substructure using the source/receiver pair data identified in step l).

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
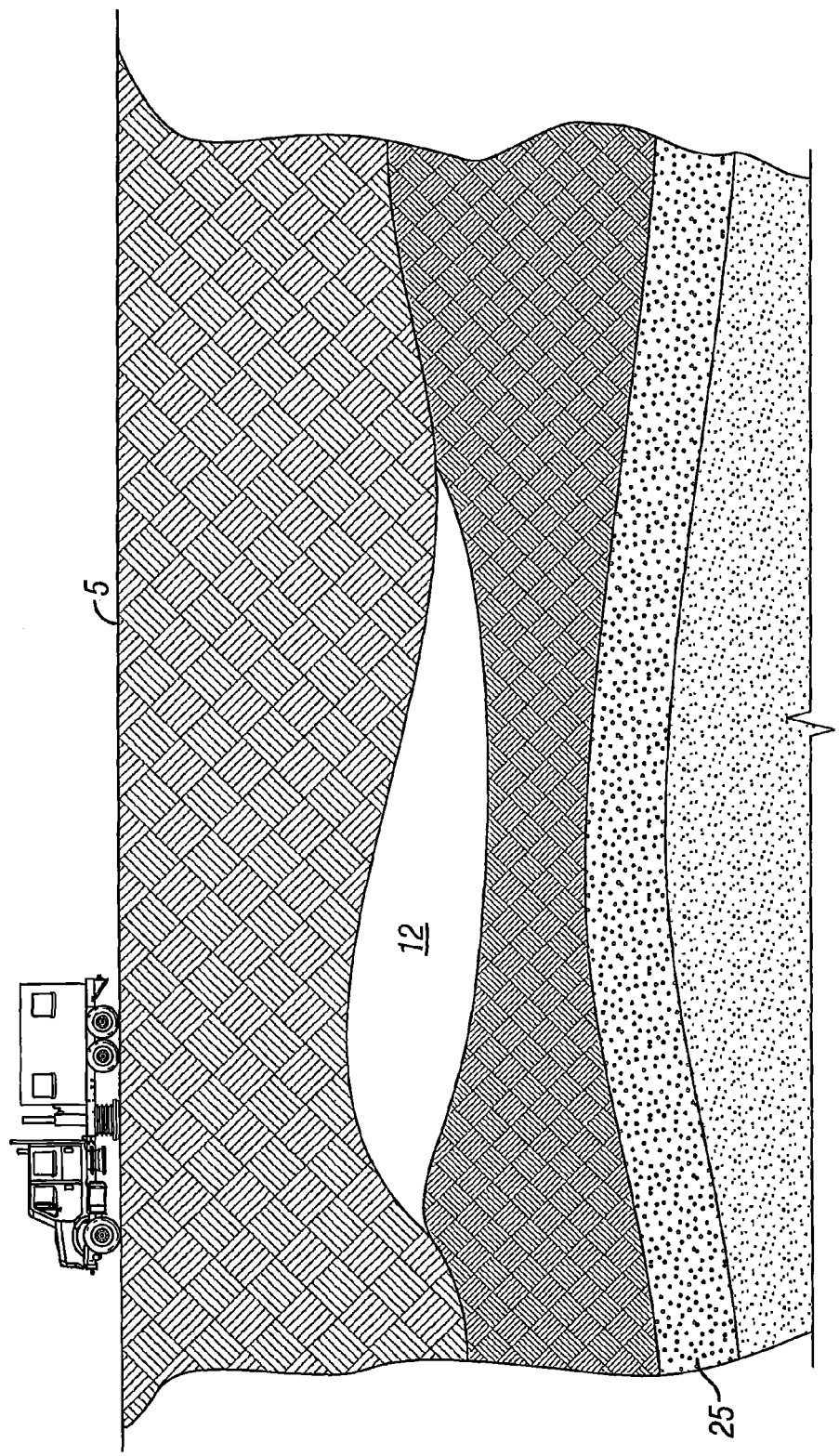
FIG. 1 is cross section of the earth showing a gas-containing formation with a formation of interest beneath the gas-containing formation.

In FIG. 1, a gas-containing structure is indicated by the number 12 underlying the surface of the earth 5. Below the gas-containing structure 12 is a prospect indicated by the number 25 having an inverted cup shape. Interest in the prospect 25 arises because the inverted cup shape may form a trap where liquid hydrocarbons may collect and pool. However, the gas containing structure 12 may also be caused by gas leaking from the prospect. If the prospect 25 truly has an inverted cup shape with porous rock below an impermeable layer above, the prospect 25 may be a prime target for drilling an oil well. However, the gas containing structure 12 obscures the seismic prospecting of the prospect 25 such that it is very difficult to assess the prospect whereas the inverted cup shape may be the seismic equivalent of an optic illusion and the structure is otherwise flat. Also, the size of the structure may be sub-economic or the structure may not be trapping the hydrocarbons or simply be too leaky. Before the cost of drilling is undertaken, it is generally preferred to fully evaluate the prospect and fully assess its shape, make sure that it is continuous or that there are no holes in the cup where the oil may continue to percolate to the surface. Such further evaluation is preferably accomplished by seismic data collection, processing, interpretation and analysis.

However, the gas-containing structure 12 above the prospect 25 is likely to obscure the seismic data from the prospect as the gas tends to attenuate seismic waves and therefore little, if any, useful coherent seismic energy is able to propagate directly through the gas-containing structure 12. The geologic models that are deduced from seismic data of this earth as shown in FIG. 1 would be indeterminate as to how deep the gas-containing structure actually is. The top of the gas-containing layer would reflect seismic energy, but essentially mask everything below that whether the gas-containing layer was just a few feet thick or a mile thick. The inventors of the present invention have recognized that by acquiring and processing seismic data that is minimally affected by the gas-containing structure 12, a well developed geologic image of the prospect may be created. For example, by arranging the shot points and receiver locations as shown by the map in FIG. 2 so as to capture seismic energy that travels to the prospect 25 and returns to the surface without travelling through the gas-containing structure 12 will reduce the complexity of the seismic data.

The process of identifying where to arrange the shot points and receiver locations requires a geologic three-dimensional model of the earth. This model may be created from existing seismic data which reveals the seismic obstruction such as gas-containing structure 12. Other helpful information includes well logs, geological maps and interpretive guesses at the primary structure of the prospect. The existing data can be analyzed by computer modeling of a proposed shot point/source receiver pairs. To properly account for the variation of the subsurface in the model a full imaging solution would be required. Simple ray tracing techniques cannot adequately image the data without severe errors in propagation. The more accurate and comprehensive analytical techniques for imaging are full two-way wave equation propagation of the source energy though the model. The two-way wave (or full wave) equation formulation can be acoustic, elastic, or other physical type depending on the nature of the geology. A solution to the equations can be found by many different methods such as finite difference or finite element methods.

With the two-way wave equation propagation data, the analysis turns to considerations of the size, shape and location of the prospect 25 relative to the gas containing structure 12 and for evaluating potential offsets and azimuth angles relative to the depth of the gas-containing structure 12. This analysis focuses on the availability of usable data around the edges and completely underneath the gas-containing structure 12. Part of the consideration is whether the original data included long enough offset and sufficient azimuth angles to capture the energy from the longest lateral dimension of the gas-containing structure 12. With long offset data, the quality of the data may significantly diminish depending on a number of factors principally including the densities of the rock structures in the ground, the technique of acquisition and the noise conditions during the survey. Another consideration is the possibility of subsurface velocity variations caused by different geologic beds or formations. These velocity variations may cause lens effects and force the source energy in unexpected directions making it difficult to predict by simple means or direct observation. Ultimately, there are practical limits to the usable offset like critical angles, but quality data may be available that may significantly enhance the quality of the geologic images that may be created. For example, if the gas-containing structure is long in the east-west direction but relatively narrow in the north-south direction, a lot of data may be available by selecting a number of shot points (energy source location) on the north side and large number of receiver (energy sensor) locations on the south side. Even if data otherwise collected from shot point receiver pairs at opposite sides of the gas-containing structure 12 is non-existent or indecipherable because of too much offset, data from shot points on the north side, but closer to the west end gas-containing structure 12 may provide valuable data when paired with receiver locations at the east and southeast sides of the gas-containing structure 12. In other words, there are a large number of diagonal shots where existing data would sharpen the data and resulting image. Thus, the first step of the process is to identify what, if any, possible source to receiver pairs could have obtained useable data for imaging the target.

The next step in the evaluation is to rank the quality of the data that could image only the prospect 25. In this example, it is likely that near offset source receiver pairs that traveled through the gas containing structure 12 twice are likely to be poor quality and will have been highly attenuated. These near offset traces are likely to be noisy and would not contribute to the quality of the image over long offset traces that never passed through the gas containing structure 12. The ranking criteria could be propagated energy level, signal to noise, distribution of offset, or shortest energy propagation path among other geophysical quality criteria. The specific criteria used to rank the quality would depend on the specific geological environment or problem that is being investigated. Regardless of the criteria chosen to optimize the image, a map can now be made of the source receiver pairs that contribute to the best possible image and they can be contoured or color coded to show the quality of the image or impact on the resulting structure. This map now shows the data that is needed to be processed for the best image while masking out all of the data that does not contribute or may be counter productive and introduce noise in the final output image. The bottom line is to image with the data that help the image and avoid utilizing data that will undermine or simply not help the image quality.

The final step is to image all of the other areas of the prospect and determine what data must be selected to image those regions. By following the same imaging analysis outlined above and determining what source and receiver pairs are contributing to the final image, a quality map for all possible source and receiver locations can be determined. This map can then be provided to the seismic imaging group for use in data selection during the imaging phase of the seismic processing. The quality map shows if the sources are critical or just helpful to the final image and this information can be used to improve the costs efficiency of the imaging.

Figure 2:
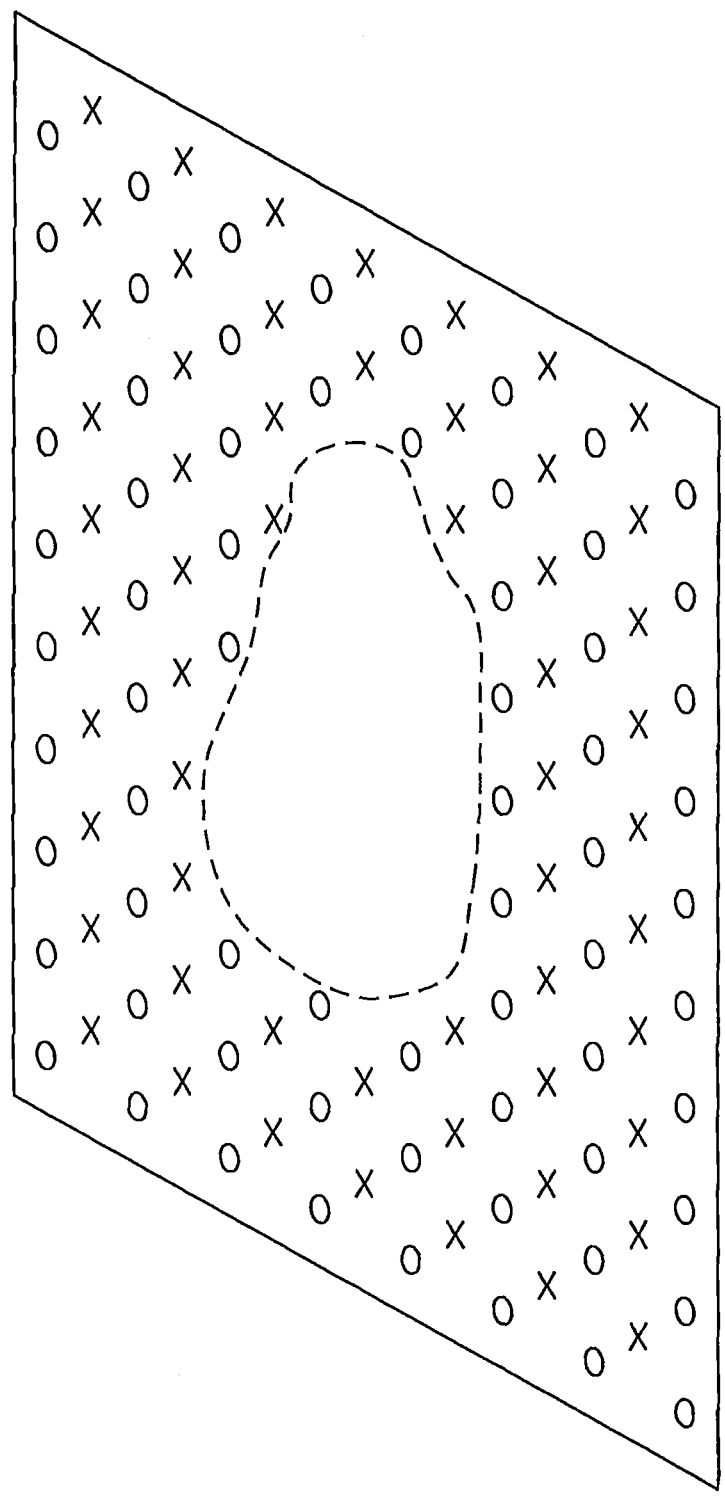
FIG. 2 is a map showing a proposed seismic survey of the area in FIG. 1 with the purpose of acquiring clean data of the formation of interest that reduces or minimizes the obscuring affects of the gas-containing formation.
Figure 3:
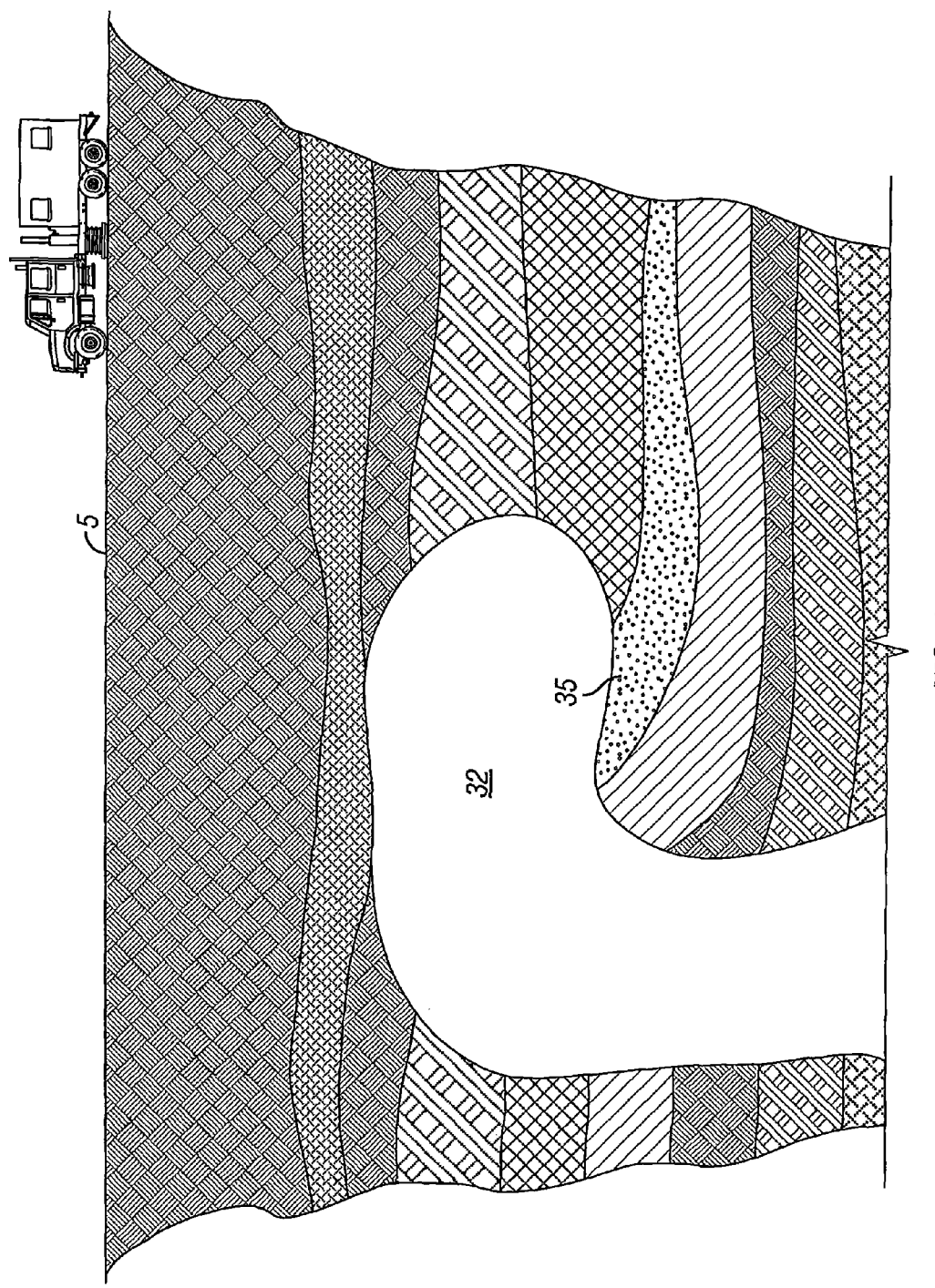
FIG. 3 is a second cross section of the earth showing a salt dome and the geologic layers that may interface with the salt dome where the interface of the overhang and the adjacent layers may be a formation of interest.

As another example, referring to FIG. 3, another prospect 35 may underlie the anvil shape of a salt dome 32. The salt dome, like the gas-containing structure 12 substantially impairs seismic data. However, by creating a basic understanding of the structure that exists, an optimized source and receiver location map may be created to enhance what is already known about an area to better illuminate or image the target such as prospect 35. The analysis for developing the source and receiver location map, such as shown in FIG. 2 may require significant analysis of the geologic model created based on existing knowledge of the subsurface structures. Very significant computer power is necessary for analysis of acoustic and elastic waveform data computations but is understood because of the extensive development of two-way wave equation migration methods.

Figure 4:
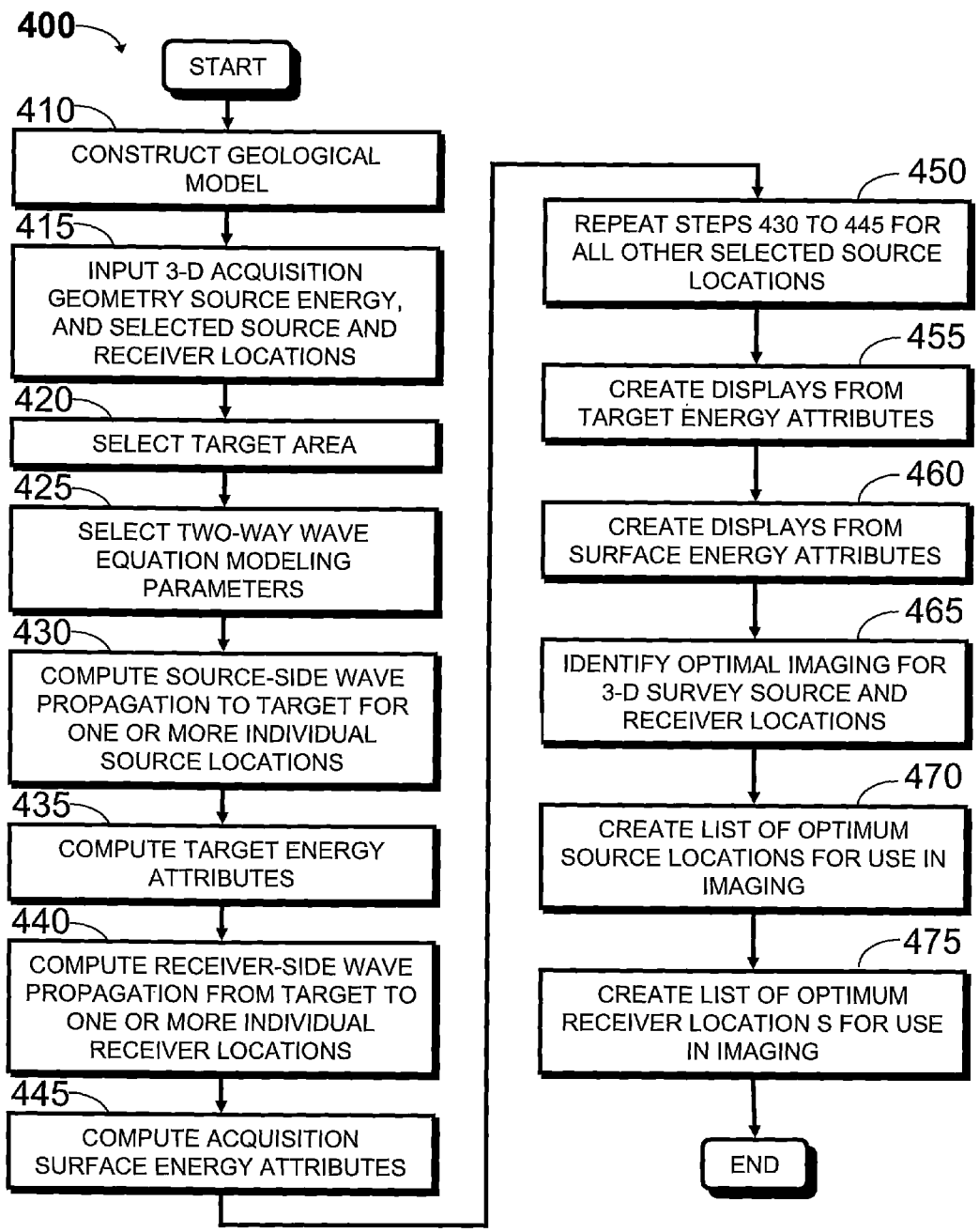
FIG. 4 is a flow chart illustrating an embodiment of the procedure for Targeted Two-way Wave Equation Data Selection.

The preferred procedure is illustrated in FIG. 4. FIG. 4 outlines one workflow embodiment that utilizes two-way wave equation propagated wave fields as a basis for several analytical displays. There are several methods for creating the wave fields utilized in the propagation of the energy. The methods require the input of a geologic model or model cube. The results of the analysis outlined in FIG. 4 are only as good as the geological map input. The model should be created from the best geological and geophysical data available and properly conditioned for two-way wave equation modeling use. Such conditioning may include smoothing and the inclusion of random noise. This model or cube will take into account the presumed prospect shape, rock properties and geologic boundaries that are present in the earth. The model should also have the best possible velocity and density information to allow for maximum resolution of the data. Together, the geologic structural cube and the velocity model are called the "model of the earth" or simply the "geologic model" as indicated in Step 410 in FIG. 4.

For improved or optimal illumination of data from a survey already acquired, the survey geometry identifying source points and receiver points are correlated with the geologic model as shown by step 415. The acquisition geometry can be the surface seismic geometry, vertical seismic profile (VSP), ocean bottom node/cable, or other type of seismic data. The selection of source points may include all source points available, but would typically include a subset of all source points and may include a small and concentrated set of points or a broader sparsely spaced set of points for various analytical considerations. The "target" area is then selected within the geologic model with the 3D survey correlated as shown at step 420 where the target may cover the entire prospect location or some portion of the prospect location. This is the area on a geologic body or prospect of interest that is to be the focus of the imaging and thus will be used as the area for focusing the investigation. This, in general, may be as large of an area for which computer time and disk space will allow for the running of the workflow. It should be noted that the larger the target area the less precise the illumination information will be for a particular area on the target. Basically it will not be possible to precisely determine what sources and receivers contribute the best data for imaging a particular area on the target, thus the target area should be limited to the extent necessary to assure a specific target imaging issue is addressed. It is better to do multiple evaluations rather than confuse the analysis by using too large of a target area.

The parameters for two-way wave equation modeling are selected at step 425. Example methods for two-way wave field propagation can be found in a number of publications including: Boore, D. M., 1972. Finite-difference methods for seismic waves, In: Methods in Computational Physics, Vol. 11, 1-37. Bolt B. A., ed., Academic Press, New York; Kelly, K. R., Ward, R. W., Treitel, S., and Alford, R. M., 1976. Synthetic Seismograms: a Finite-Difference Approach, Geophysics, 41, 2-27; Baysal, E., D. D. Kosloff, and J. W. C. Sherwood, 1983, Reverse-time migration: Geophysics, 48, 1514-1524; McMechan, G. A., 1983, Migration by extrapolation of time-dependent boundary values: Geophysical Prospecting, 31, 413-420; and Whitmore, D. N., 1983, Iterative depth imaging by back time propagation: $53^{rd}$ Annual International Meeting, SEG, Expanded Abstracts, 382-385.

There are also several methods for constructing the actual energy propagated by specific desired wave fields. One method involves direct two-way wave propagation from each desired source. A second and generally more efficient method is the propagation of wave fields emanating from a dense grid of modeled point sources located on the target and propagated to the surface. This method allows for the construction of both source-side and receiver-side wave propagation for all acquisition sources. In general great care has to be taken when using only portions of geologic bodies for this type of analysis since edge effects can be an issue and misleading. The two-way wave equation propagation requires considerable computer resources and the parameters, such as maximum frequency, must be carefully chosen. In some cases it is possible to only compute a single frequency, a few frequencies, or a frequency range to obtain sufficient information for an analysis sometimes resulting in dramatically reducing the computation time.

With the parameters selected, the wave propagations are computed in both the source side and receiver side through the geologic model as identified in Steps 430 and 440. The source-side wave field begins at the source and proceeds to the target, and the receiver-side wave field begins by reflecting off the illuminated portion of the target and proceeds to the receivers. This computational effort is substantial and requires a lot of computer time. Note that the propagation of the energy is very complex and multi-pathed depending on the complexity of the geologic model. Breaking this effort up into its individual steps, in Step 430 the wave field propagation is computed from the source through the geological model. In Step 435, the computed energy of the wave field from Step 430 is computed to determine attributes of the seismic energy at the target or prospect. Such attributes of interest include incident angle and energy intensity. In Step 440, the receiver-side wave field is computed considering its travel through the geologic model. At the surface, the energy values and attributes are compared to the measured data at the surface locations from the seismic survey. It should be noted that the energy levels and attributes that are calculated at the target and at the acquisition surface as shown in Steps 435 and 445 for each source-receiver pair are used in the remainder of the work flow.

The Step 430 creates a 3-D source-side energy volume that is discretely sampled spatially and in depth as the energy is propagated. The result is a 3-D energy volume for each source that can be examined similar to a seismic 3-D volume to determine how the energy propagates. The attribute of each sample is the arriving energy level at the discrete sample. In two-way wave field propagation the propagation path can become quite complex but in some cases the energy path to the target can be identified. In a similar way Step 440 creates a 3-D receiver-side energy volume that is discretely sampled spatially and in depth as the energy is propagated to the sensors. Only portions of the target that received energy from the source-side wave field will emit energy for propagation to the surface. The receiver-side wave field propagation will create a 3-D energy volume for each source that can be examined similar to a seismic 3-D volume to analyze the path of the receiver-side energy. These two 3-D energy volumes can be analyzed to determine if focusing or scattering are occurring or if the model has a peculiar propagation property that is not physically realistic.

Using the energy and attributes from Steps 435 and 445, various displays are created as shown in Steps 455 and 460 that are preferably utilized interactively but may be used in more conventional ways such as hard copies or simple screen captures for redisplay. In practice, not all displays are be created because of the volume of information and considering that several of the individual displays will not likely add sufficient additional information to aid in analysis.

Specifically in Step 455, displays using the computed target energy attributes from Step 435 are created. One display is a map of the single source energy values computed in Step 435. In practice there will be one map for each individual source. The map shows the energy level as received at the target. The second display is a map of the incident angles of the energy at the target location or prospect location. There will be one map for each individual source with the map showing the incident angle of the energy received at the target. The third display is a map of the take-off angles of the wave field from the target location. Again there will be one map for each individual source and only portions of the target that were illuminated by the down-going wave field will be visualized. The map will show the take-off angle of the upcoming energy at the target location. The third display is a map of all energy received at the target. In this case, all energy from all sources is summed and displayed as a map with the coordinates being for the target and the attribute being the summed energy value. In the case of all of the above maps the attribute can be displayed as a 3-D visualization with the target providing 3-D structure prospective and the specific attribute being used to set a color scale to overlay the attribute on the target structure 3-D visualization. As an additional display, a rose diagram utilizing all energy may be created. Similar to conventional rose diagrams used in standard acquisition design software, summary rose diagrams can be created to visualize the relationship between the source location and the total energy received at the target. Each source will have a specific azimuth, offset and total energy received at the target associated with it. By summing all sources an azimuth-offset rose diagram can be created in which the attribute is the total energy received at the target for that particular azimuth-offset combination. Similarly other rose diagrams can be created where the incident angle is the attribute. A skilled geophysicist may use all of the displays and maps to rationalize more precisely the sources that have the highest potential for propagating energy to the target.

Specifically in Step 460, displays using the computed acquisition surface energy attributes from Step 445 are created. One display is a map of the single source energy values computed in Step 445 from the receiver-side energy associated with one specific source. In practice there will be one map for each associated individual source. The map shows the energy level as received at the receivers emanating from the portion of the target illuminated by the source. A standard rose diagram can be created where the coordinates for the rose diagram are the offset distance from the source and the receivers that receive energy. The attribute for the rose diagram is the energy received by each sensor. Another display is a map created by summing all the energy received by all sensors and assign that as an attribute to the emitting source point. The map would be a map of the source locations with the summed energy being an attribute to plot at the source location. A similar map of total received energy can be made by summing all energy received by a sensor from all sources. A map of the sensor locations would be made with an attribute being plotted being the summed energy received by each sensor. These two maps then show the locations of sources that result in the most energy being received at sensor locations and sensor locations that receive the most energy. As an additional display a rose diagram utilizing all energy received at the acquisition surface can be created. Similar to a rose diagrams used in standard acquisition design software, a summary rose diagram can be created to visualize the relationship between the source location and the energy received by the sensors. Each source-sensor pair will have a specific azimuth, offset and total energy received at the surface. By summing all source-sensor pairs an azimuth-offset rose diagram can be created in which the attribute is the total energy received at the acquisition surface for a given azimuth-offset configuration. A skilled geophysicist may use all of the displays and maps to rationalize more precisely the sources that have the highest potential for propagating energy to the target and the sensor locations that have the highest potential for receiving the source generated energy.

A skilled geophysicist may use all of the displays to rationalize more precisely the source/receiver pairs that provide the most revealing information about the target structure or prospect structure. These source/receiver pairs have the best probability of optimizing the imaging of the prospect 25. These source/receiver pairs are preferably ranked in terms of geophysical quality and then contoured or color coded onto a map showing where the optimal source and receiver pairs would be located to image the desired target. This quality map would show both the priority and quality of the sources and receivers to imaging the prospective target.

Once the quality map is created, the map is analyzed for priority of shot and receiver locations to determine the critical priority for imaging. It is likely that a certain background level of shots and receivers are needed to establish a background image volume. Once this background quality is established then the rest of the shot receiver pairs can be analyzed in terms of the overall quality to see what are the critical shots and receivers that must be used for imaging. During this analysis process, one could prioritize the costs verses quality of the imaging. The preferred imaging method for the selected data would be a two-way wave equation based depth imaging/migration work flow.

Another realization of the invention is to utilize subsets of the existing seismic acquisition geometry in Step 415 by utilizing only specific sources and receivers. In this way, the impact of specific sources and specific receivers can be evaluated.

In another realization the proposed optimal input geologic model in Step 410 is modified to represent alternative interpretations or ideas about how the various prospect structure 25 and obscuring structures are shaped and spaced from one another. The FIG. 4 work flow is again performed to determine if the previously determined source receiver locations are still optimal to image alternative interpretations of the geology. If they are still reasonable then the imaging project could proceed, otherwise the source and receive locations selected would need to be modified so they would optimally image the range of possibilities of the prospect.

Another realization of the invention would be to repeat the work flow in FIG. 4 on several different targets of the whole geologic model and then wave equation image these smaller target areas using the selected sources and receivers. These results would then be merged and summed into a larger survey where the different areas could be ranked for overall quality of image. This approach would allow many smaller targets to be optimally imaged and the relative quality of the overall image improved by optimizing the imaging over the whole survey.

Other realizations of the invention include repeating the work flow in FIG. 4 to compute a single frequency, several frequencies, or a range or ranges of frequencies to obtain sufficient information for an analysis often resulting in a dramatic reduction of the computation time and resources required.

Additionally, by repeating the work flow in FIG. 4 one or more receiver locations may be identified on multiple acquisition surfaces to improve signal quality, reduce the number of signals required and increase acquisition efficiency.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. Baysal, E., D. D. Kosloff, and J. W. C. Sherwood, 1983, Reverse-time migration: Geophysics, 48, 1514-1524;
2. Boore, D. M., 1972. Finite-difference methods for seismic waves, In: Methods in Computational Physics, Vol. 11, 1-37.
3. Bolt B. A., ed., Academic Press, New York; Kelly, K. R., Ward, R. W., Treitel, S., and Alford, R. M., 1976. Synthetic Seismograms: a Finite-Difference Approach, Geophysics, 41, 2-27;
4. McMechan, G. A., 1983, Migration by extrapolation of time-dependent boundary values: Geophysical Prospecting, 31, 413-420;
5. Whitmore, D. N., 1983, Iterative depth imaging by back time propagation: $53^{rd}$ Annual International Meeting, SEG, Expanded Abstracts, 382-385
6. Xu, S. and Jin, S., 2005, Can we image beneath salt body?—target-oriented visibility analysis: 75th Annual International Meeting, SEG, Expanded Abstracts, 1997-2000.

The invention claimed is:
1. A process for imaging seismic data for a prospect that exists within or near structures that obscure or complicate seismic imaging, where the process comprises:
   a) constructing a first geologic model including information about the size, shape and depth of the obscuring or complicating structure along with a prospect location for further understanding;
   b) identifying a set of seismic source locations within the seismic data along with seismic acquisition geometry for associated seismic receiver locations to be evaluated with the geologic model;
   c) selecting a target on a geologic body for evaluation wherein the target may comprise a portion or an entirety of the prospect location;
   d) selecting parameters appropriate for a two-way wave equation propagation of energy;
   e) computing a two-way wave equation for the wave propagation from a selected source to the target;
   f) computing the energy arriving at the target and the associated attributes of the arriving energy at the target;
   g) computing a two-way wave equation propagation for wave propagation from the target to the receivers associated with the selected source by the acquisition geometry;
   h) computing the energy and the associated attributes received by the receivers associated with the selected source by the acquisition geometry from g);
   i) repeat steps e) through h) for other sources in the selected acquisition geometry;
   j) from the energy and attributes recorded in step f) create attribute displays that provide visual perspective of one or more attributes of the energy propagated to the target from one or more sources;
   k) from the energy and attributes computed in step h) create attribute displays that provide visual perspective of one or more attributes of the energy associated with one or more acquisition sources propagated from the target to the receivers;
l) analyze the attribute displays in step j) and step k) to determine the source/receiver pair information that will provide better imaging of the target; and
m) creating one or more geological images of the substructure using the source/receiver pair data identified in step l).

2. The process according to claim 1, further comprising the step of selecting a different set of source locations in step b) and repeating steps e) through m) and comparing the resulting attribute displays, geological images or both attribute displays and geological images.

3. The process according to claim 1, further comprising the step of selecting different receivers in step b) and repeating steps e) through m) and comparing the resulting attribute displays, geological images or both attribute displays and geological images.

4. The process according to claim 1, further comprising the step of selecting different source locations and different receivers in step b) and repeating steps e) through m) and comparing the resulting attribute displays, geological images or both attribute displays and geological images.

5. The process according to claim 1, wherein
a) a second geological model is introduced into the process at step a) wherein the second geological model is an alternative interpretation of the geology around the target; and
b) steps d) through m) are repeated and the images are compared to the images created by the process utilizing the first geological model.

6. The process according to claim 1, wherein a second target is selected at a separate geologic body and the process is repeated for the second target.

7. The process according to claim 1, wherein the selected two-way wave equation parameters are altered and steps d), through m) are repeated.

8. The process according to claim 1, wherein step j) further includes creating a map of the single source energy received at the target for each source.

9. The process according to claim 1, wherein step j) further includes creating a map of the incident angles at the target of the energy for each source.

10. The process according to claim 1, wherein step j) includes creating a rose diagram indicating the energy received from a plurality of sources at the target where the rose diagram axes are created by the source to target azimuth and offset and the plotted attribute is the total energy received.

11. The process according to claim 1, wherein step k) includes creating a map of the single source energy received by the receivers.

12. The process according to claim 1, wherein step k) includes creating a map of the summed source energy received by the receivers and mapped as an attribute for the receivers.

13. The process according to claim 1, wherein step k) includes creating a map of the summed energy received by the receivers for each source and mapped as an attribute for the sources.

14. The process according to claim 1, wherein step k) includes a rose diagram using the all source and receiver locations to establish the source receiver azimuth and offset plotting axis with the attribute plotted being the total energy received at the acquisition surface by the source and receiver coordinate pair.

15. The process according to claim 1, wherein step e) includes the visualization of the 3-D energy volume for an individual source as propagated from the source to the target by using standard seismic 3-D visualization tools to render certain energy values transparent thus revealing the strong energy paths from the source to the target.

16. The process according to claim 1, wherein step g) includes the visualization of the 3-D energy volume as propagated from the target to the receivers associated with the associated source by using standard seismic 3-D visualization tools to render certain energy values transparent thus reveling the strong energy paths from the target to the receivers.

17. The process according to claim 1, comprising the step of selecting a frequency range in step d) and repeating steps e) through m) and comparing the resulting attribute displays, resulting geological images, or both.

18. The process according to claim 1, comprising the step of selecting a set of discrete frequencies in step d) and repeating steps e) through m) and comparing the resulting attribute displays, resulting geological images, or both.

19. The process according to claim 1, comprising the step of selecting a single frequency in step d) and repeating steps e) through m) and comparing the resulting attribute displays, resulting geological images or both.

20. The process according to claim 1, comprising the step of selecting multiple sets of receivers located on multiple surfaces above the target in step b) and repeating steps e) through m) and comparing the resulting attribute displays, resulting geological images or both.

21. The process according to claim 1, comprising the step of selecting receivers located on one surface above the target and a second set of receiver locations located on a second surface above the target in step b) and repeating steps e) through m) and comparing the resulting attribute displays, resulting geological images, or both.

* * * * *